July 12, 1938. G. F. COLLEY 2,123,524
TIRE VALVE TOOL
Filed June 5, 1937
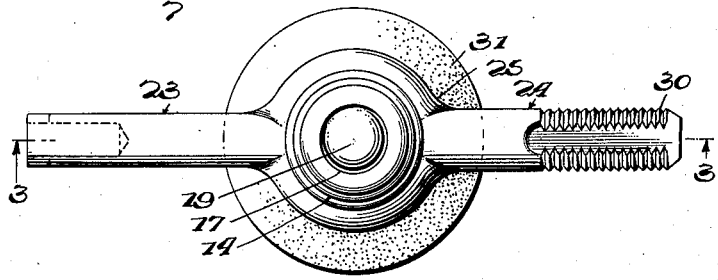
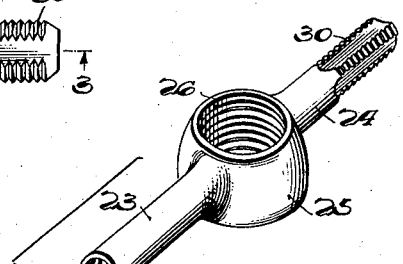
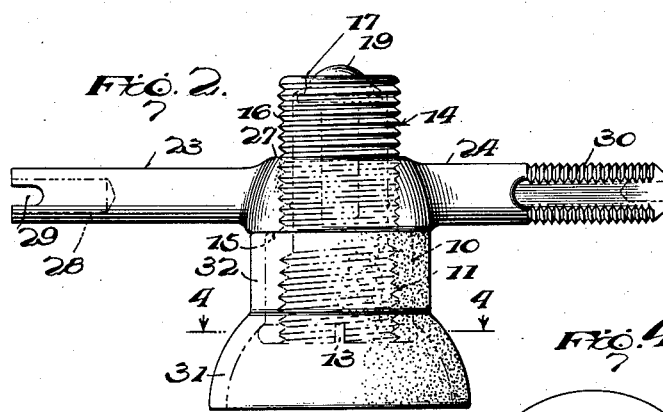
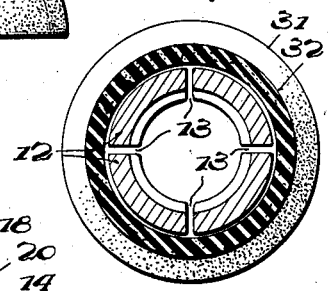
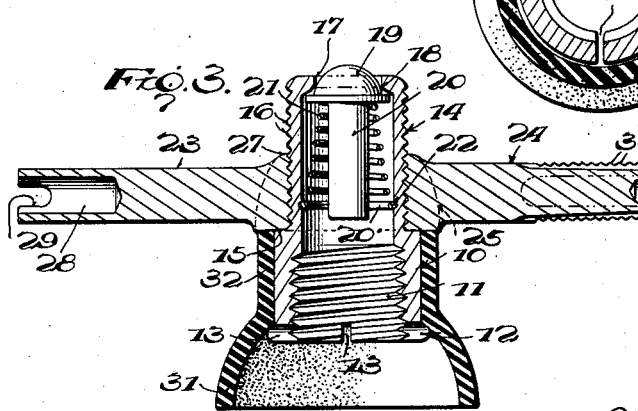
Inventor
George F. Colley
By B. P. Fishburne
Attorney Patented July 12, 1938

2,123,524

UNITED STATES PATENT OFFICE 2,123,524

TIRE VALVE TOOL

George F. Colley, Jacksonville, Fla., assignor to Merchants and Manufacturers Inc., Jacksonville, Fla., a corporation of Florida Application June 5, 1937, Serial No. 146,686

1 Claim. (Cl. 137—69)

My invention relates to a tire valve tool.

Important objects of the invention are to provide a device of the above mentioned character which will permit of the ready inflation of the tire without the removal of the device; which will renew, cut, and ream out threads upon the interior of the valve stem; which will renew and cut the threads upon the exterior of the valve stem; which may be used to remove valve cores; which may be used as a tire deflator; which will permit of the tire being inflated through the automatic valve of the device; which will permit of the testing of the air pressure through the device; which may be used as a tire tool to hold the valve stem in place, or in the hole in the rim when changing tires; which can be used to straighten or adjust valve stem to proper position in the rim when putting a tire upon the wheel or rim; and which will serve as a dust guard when applied to the stem.

Other objects and advantages of the invention will be apparent during the course of the following description.

In the accompanying drawing forming a part of this application and in which like numerals are employed to designate like parts throughout the same, Figure 1 is a plan view of a tire valve tool embodying my invention, Figure 2 is a side elevation of the same, Figure 3 is a vertical longitudinal section taken on line 3—3 of Figure 1, Figure 4 is a horizontal section taken on line 4—4 of Figure 2, and Figure 5 is an exploded perspective view of the device.

In the drawing, wherein for the purpose of illustration is shown a preferred embodiment of my invention, the numeral 10 designates the tubular body portion of the device, having internal screw-threads 11, to engage with the external screw-threads of the tubular stem of the valve carried by the inner tube of the tire, as is well known. At one end, this tubular body portion is provided with a die 12, to renew or cut the exterior screw-threads upon the tubular valve stem, the die having radial slots 13. Formed integral with the opposite end of the tubular body portion 12 is a reduced tubular portion 14, affording a shoulder 15, and this reduced portion may be externally threaded, as shown at 16, while these threads could be omitted.

The reduced tubular portion 14 is provided in its free end with an opening 17, and a valve seat 18, to be engaged by an inwardly opening check valve 19, carrying a stem 20. This stem is surrounded by a compressible coil spring 21, engaging the valve 19 and having its opposite end engaging a keeper 20' which is held within an annular groove 22.

I provide a handle which is mounted upon the tubular body portion 10 to turn the same, and this handle comprises preferably tubular oppositely arranged radial arms 23 and 24, formed integral with a hub 25. This hub is shown as provided with a screw-threaded opening 26, to receive the screw-threaded reduced portion 14. The hub engages the shoulder 15, and the unscrewing of the hub may be prevented by mashing the material of the same slightly, as shown at 27, or by any other suitable means. The screw-threaded engagement between the hub and the stem may be omitted, and these parts held together by a clamping fit, welding, or any other suitable means.

The arm 23 is provided with a longitudinal opening or bore 28, and notches 29, at its end, whereby this arm is also adapted to serve as a core-wrench for removing the core from the valve stem. The arm 24 is provided with blades 30 and also serves as a tap to renew, cut and ream out the threads upon the interior of the tubular valve stem.

The numeral 31 designates a flexible or resilient guard or seal, preferably formed of rubber, and adapted to fit about the tubular valve stem and to engage the rim of the wheel to prevent dust or dirt reaching the valve stem. This guard or seal has a tubular neck 32, held upon the tubular body portion 10, as shown.

In use, the ordinary cap carried by the tubular stem of a tire valve is removed, and the tubular body portion 10 screwed upon this stem, and this screwing action may be conveniently effected by the use of the arms 23 and 24. When thus applied, the guard or shield 31 will surround the tubular stem and engage the rim of the wheel, whereby the entire device serves as a dust guard, excluding dirt and dust from the tubular stem. When it is desired to inflate the tire the hose from the pump is arranged upon the reduced portion 14, and the check valve 19 will automatically open inwardly to permit of the passage of the air to the inner tube, and automatically close, as is obvious. When the body portion 10 is applied to the tubular stem, the die 12 renews, shapes or cuts the threads upon the exterior of the tubular stem. By removing the device from the stem, the arm 23 may be inserted into the stem and be used as a core-wrench to unscrew and remove the core.

The arm 24 may be inserted into the tubular stem to renew or cut the interior threads of the same.

It is to be understood that the form of my invention herewith shown and described is to be taken as a preferred example of the same, and that various changes in the shape, size, and arrangement of parts may be resorted to without departing from the spirit of my invention or the scope of the subjoined claim.

Having thus described my invention, what I claim is:

A combined tire valve cap and tool, comprising a tubular body portion provided near one end with internal screw threads for engagement with the screw threads of the stem of the tire valve, said tubular body portion being provided at the outer end of the internal screw threads with an internal die having slots to cut or restore the threads of the valve stem, the tubular body portion having its outer end portion reduced for affording a shoulder arranged between the ends of the tubular body portion, a handle having a screw threaded opening to receive the reduced screw threaded portion of the tubular body portion and to have clamping action with the shoulder, said handle extending radially beyond the tubular body portion on opposite sides, the tubular body portion having its reduced portion provided at its free end with an opening and a valve seat, a spring pressed inwardly opening check valve arranged within the reduced portion to engage the valve seat, and a flexible guard surrounding the tubular body portion beneath the handle and projecting outwardly beyond the internal die for a substantial distance for covering the slots thereof.

his
GEORGE F.   X   COLLEY.
                   mark

Witness to mark:
L. K. WALRATH.